US011878614B2

United States Patent
Makino et al.

(10) Patent No.: US 11,878,614 B2
(45) Date of Patent: Jan. 23, 2024

(54) VEHICLE SEAT

(71) Applicant: TOKAI CHEMICAL INDUSTRIES, LTD., Gifu (JP)

(72) Inventors: Keiji Makino, Gifu (JP); Toshiharu Tsuzuki, Gifu (JP)

(73) Assignee: TOKAI CHEMICAL INDUSTRIES, LTD., Gifu (JP)

( * ) Notice: Subject to any disclaimer, the term of this patent is extended or adjusted under 35 U.S.C. 154(b) by 0 days.

(21) Appl. No.: 17/834,879

(22) Filed: Jun. 7, 2022

(65) Prior Publication Data
US 2022/0297583 A1 Sep. 22, 2022

Related U.S. Application Data

(63) Continuation of application No. PCT/JP2021/006849, filed on Feb. 24, 2021.

(30) Foreign Application Priority Data

Feb. 27, 2020 (JP) .................................. 2020-031177

(51) Int. Cl.
*B60N 2/80* (2018.01)
(52) U.S. Cl.
CPC .......... *B60N 2/80* (2018.02); *B60N 2002/899* (2018.02)
(58) Field of Classification Search
CPC ............................ B60N 2/80; B60N 2002/899
See application file for complete search history.

(56) References Cited

U.S. PATENT DOCUMENTS

| 9,452,697 B2 * | 9/2016 | Okubo | B60N 2/68 |
|---|---|---|---|
| 9,511,695 B2 * | 12/2016 | Okubo | B60N 2/64 |
| 9,981,587 B2 * | 5/2018 | Mizobata | B60N 2/80 |
| 10,150,394 B2 * | 12/2018 | Kobayashi | B60N 2/80 |
| 10,227,026 B2 * | 3/2019 | Takahashi | B60N 2/80 |
| 10,384,377 B2 * | 8/2019 | Mizobata | B29C 44/1257 |

(Continued)

FOREIGN PATENT DOCUMENTS

| JP | 2008296732 | 12/2008 |
|---|---|---|
| JP | 2014073792 | 4/2014 |
| JP | 2017007480 | 1/2017 |

(Continued)

OTHER PUBLICATIONS

"Written Opinion of the International Searching Authority (Form PCT/ISA/237) of PCT/JP2021/006849," dated May 25, 2021, with English translation thereof, pp. 1-10.

(Continued)

*Primary Examiner* — Philip F Gabler
(74) *Attorney, Agent, or Firm* — JCIPRNET

(57) ABSTRACT

Provided is a vehicle seat that includes a dynamic damper having desired properties, and that makes it possible to improve a mass holding angle and to reduce cost. A vehicle seat (1) includes: a frame (11a, 12a, 13a); a case (20) attached to the frame (11a, 12a, 13a); and a dynamic damper (30) that is housed in the case (20) and that includes a mass (40) and an elastic body (50). The elastic body (50) includes at least an annular elastic body (51) as a member having a through hole. The mass (40) is fitted to the through hole of the annular elastic body (51), and the outer peripheral surface of the annular elastic body (51) is disposed in contact with the inner wall of the case (20).

15 Claims, 4 Drawing Sheets

(56) References Cited

U.S. PATENT DOCUMENTS

2012/0098316 A1* 4/2012 Matsushima .......... B60N 2/818
297/391

FOREIGN PATENT DOCUMENTS

| JP | 2017141022 | 8/2017 |
| WO | 2014017232 | 1/2014 |

OTHER PUBLICATIONS

"International Search Report (Form PCT/ISA/210) of PCT/JP2021/006849," dated May 25, 2021, with English translation thereof, pp. 1-4.
Office Action of Japan Counterpart Application, with English translation thereof, dated Sep. 5, 2023, pp. 1-9.

* cited by examiner

VEHICLE SEAT

CROSS-REFERENCE TO RELATED APPLICATION

The present application is a continuation of PCT/JP2021/006849, filed on Feb. 24, 2021, and is related to and claims priority from Japanese Patent Application No. 2020-031177, filed on Feb. 27, 2020. The entire contents of each of the aforementioned applications are hereby incorporated by reference herein.

BACKGROUND

Technical Field

The disclosure relates to a vehicle seat.

Description of Related Art

Patent Documents 1 to 3 disclose to provide a dynamic damper in a headrest, a seat back, etc., forming a vehicle seat for the purpose of reducing the vibrations transmitted from the internal combustion mechanism of the vehicle or the road surface to the vehicle seat.

In Patent Documents 1 to 3, a dynamic damper having a configuration in which a mass is sandwiched by using a pair of elastic bodies is disclosed. In addition, Patent Document 2 discloses configurations such as a configuration in which two elastic bodies in a bottomed container shape are respectively fitted to two ends of the mass and a configuration in which sheet-like elastic bodies are respectively provided on the six surfaces of a rectangular parallelepiped mass.

PRIOR ART LITERATURE

Patent Documents

Patent Document 1: Japanese Laid-open No. 2017-007480
Patent Document 2: Japanese Laid-open No. 2017-141022
Patent Document 3: Japanese Laid-open No. 2014-073792

SUMMARY

Issues to be Solved

However, in the configuration in which a mass is sandwiched by a pair of elastic bodies, there is a concern that a gap may be easily formed between the mass and the elastic body, and the mass is not held stably. As a result, due to the influence of the gap, the dynamic damper may not be able to exhibit desired properties. Although it is possible to solve the issue by making the shape of the elastic body highly accurate, such solution increases the cost.

In addition, in the configuration in which the elastic bodies in a bottomed container shape are fitted to the mass, if the mass is in close contact with the elastic bodies, there is a concern that the bottom surface side and the opening side (the side opposite to the bottom surface) in the container shape may have different elastic properties. As a consequence, it is not easy for the dynamic damper to fulfill the desired properties. Moreover, in the configuration in which the elastic body sheets are arranged on the respective surfaces of the rectangular parallelepiped mass, the number of elastic body sheets is increased. Therefore, man-hours are required in addition to the increase in the number of parts and, as a result, the cost is increased.

An objective according to an embodiment of the disclosure is to provide a vehicle seat including a dynamic damper having desired properties and capable of improving a mass holding posture and reducing the cost.

Means for Solving Issues

A vehicle seat according to an embodiment of the disclosure includes a frame, a case attached to the frame, and a dynamic damper accommodated in the case and including a mass and an elastic body. The elastic body at least includes an annular elastic body as a member having a through hole. The mass is fitted to the through hole of the annular elastic body. An outer peripheral surface of the annular elastic body is arranged to contact an inner wall surface of the case.

The mass is fitted to the through hole of the annular elastic body. Accordingly, the mass is held at a stable posture in the annular elastic body. As a result, the dynamic damper can easily exhibit the desired properties. In addition, the annular elastic body is formed in a shape (e.g., a cylindrical shape, a frame shape, etc.) having a through hole. Therefore, compared with an elastic body in a shape of a bottomed container, the annular elastic body having a through hole is capable of suppressing different properties depending on parts in the penetration direction. From this as well, the dynamic damper can easily exhibit the desired properties.

DESCRIPTION OF THE EMBODIMENTS

1. Application Target

Figure 1:
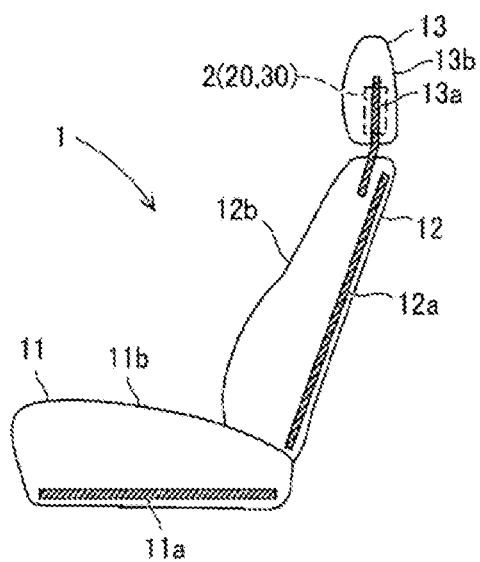
FIG. 1 is a partial cross-sectional view when viewed from a side surface of a vehicle seat.

The configuration of a vehicle seat 1 is described with reference to FIG. 1. As shown in FIG. 1, the vehicle seat 1 mainly includes a seat body 11, a seat back 12, and a headrest 13.

The seat body 11 forms a seat surface and includes a frame 11a and a cushion 11b. The seat back 12 is connected to the seat body 11 to be reclinable, and includes a frame 12a and a cushion 12b. The headrest 13 is connected to the upper end of the seat back 12 and includes a frame 13a and a cushion 13b. Here, the frame 13a in the headrest 13 is referred to as a headrest stay.

In addition, the vehicle seat 1 further includes a damper unit 2. The damper unit 2 includes a case 20 and a dynamic damper 30 accommodated in the case 20. The damper unit 2 is attached to one of the frame 11a of the seat body 11, the frame 12a of the seat back 12, and the frame 13a of the headrest 13. In the example, the damper unit 2 is attached to the headrest stay, which is the frame 13a of the headrest 13. However, the damper unit 2 may also be attached to other frames 11a and 12a.

The dynamic damper 30 is expected to exhibit a high vibration-suppressing effect by being arranged in the headrest 13 which is a location remote from the vibration fulcrum of the vehicle seat 1. Also, since the seat back 12 swings with the support point on the seat body 11 as the center, from this point as well, the dynamic damper 30 exerts a high vibration-suppressing effect through being arranged in the headrest 13.

2. (Configuration of Headrest 13)

Figure 2:
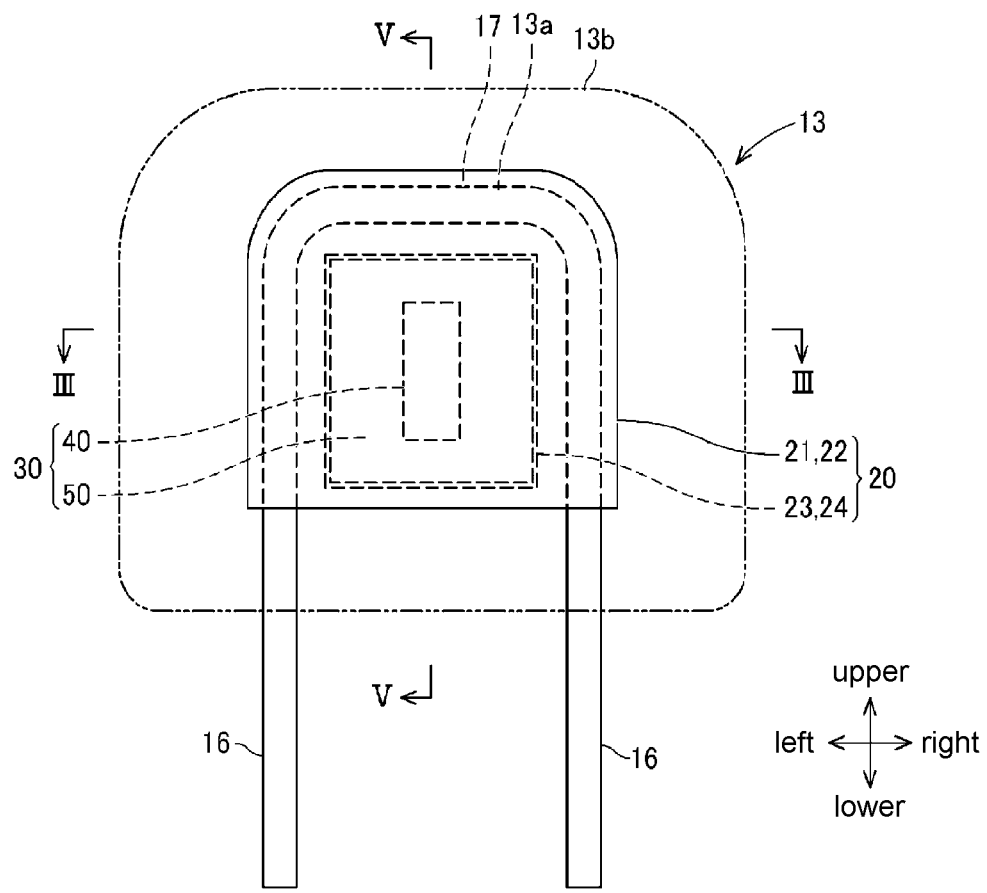
FIG. 2 is a view when viewed from a front surface of a headrest, and illustrates a damper unit of a first example.
Figure 3:
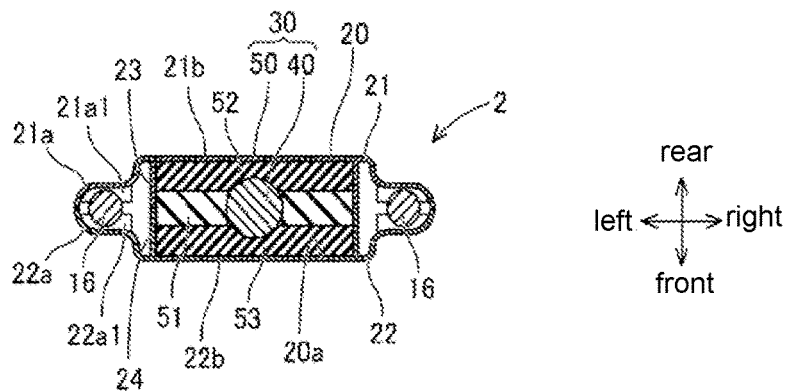
FIG. 3 is a cross-sectional view taken along III-III of FIG. 2, and includes a portion of the damper unit and a headrest stay of the first example.
Figure 4:
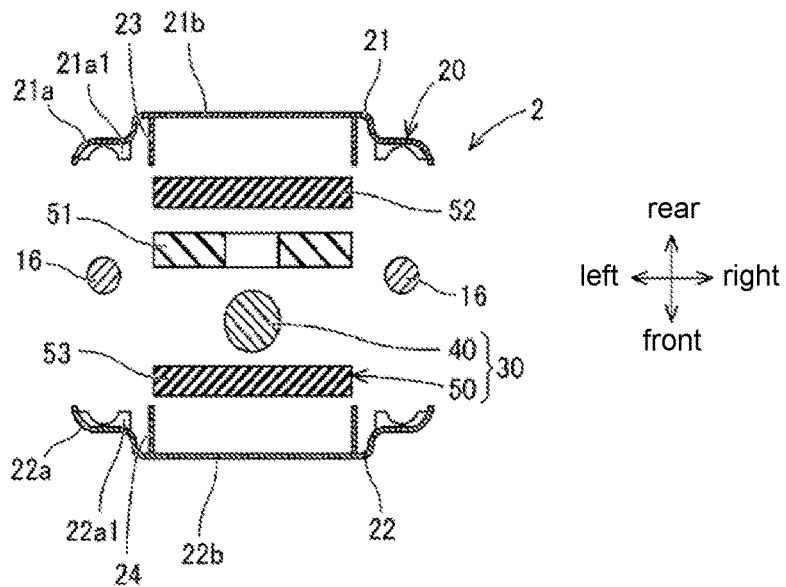
FIG. 4 is an exploded view of the components of FIG. 3.
Figure 5:
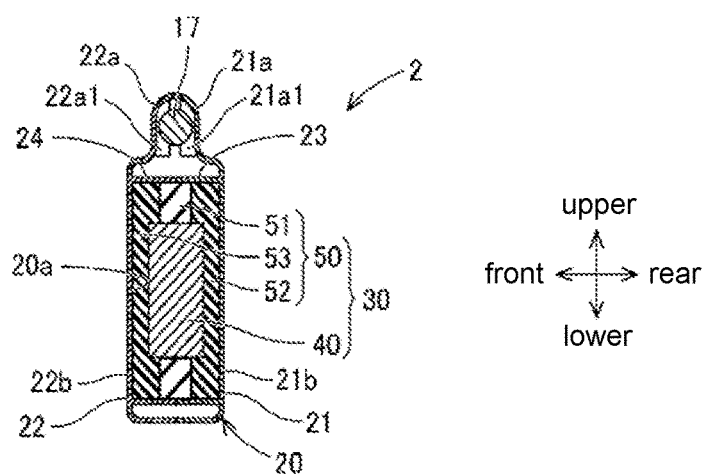
FIG. 5 is a cross-sectional view taken along V-V of FIG. 2, and includes a portion of the damper unit and the headrest stay of the first example.
Figure 6:
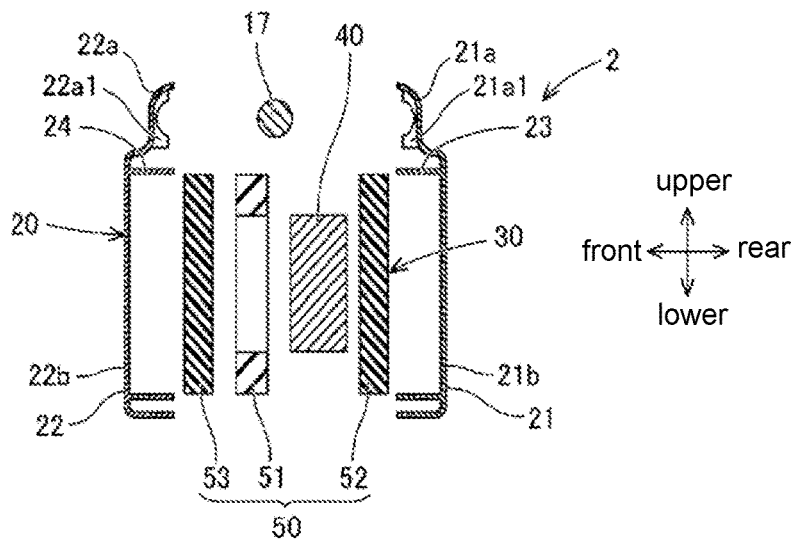
FIG. 6 is an exploded view of the components of FIG. 5.
Figure 7:
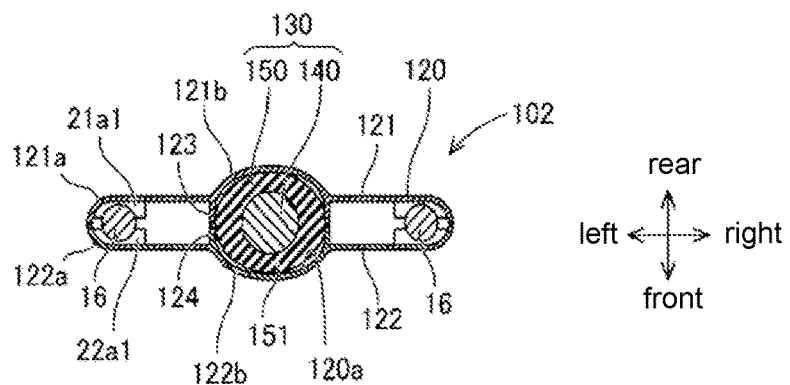
FIG. 7 is a cross-sectional view taken along III-III of FIG. 2, and includes a portion of a damper unit and a headrest stay of a second example.
Figure 8:
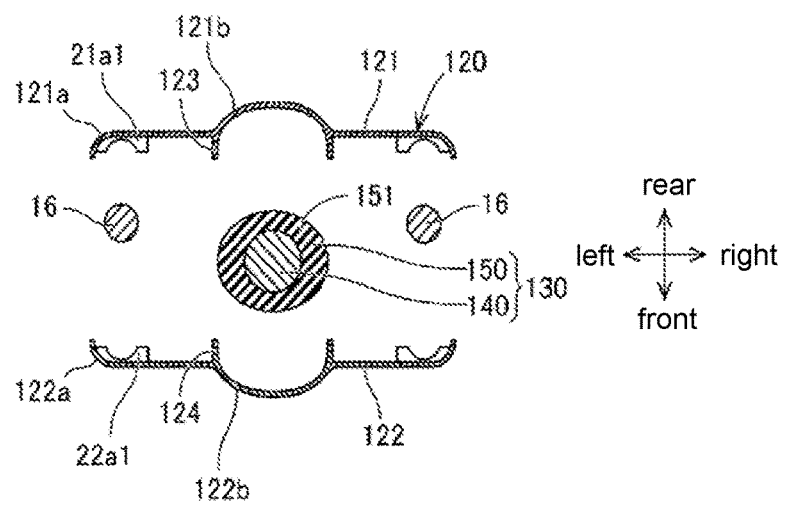
FIG. 8 is an exploded view of the components of FIG. 7.
Figure 9:
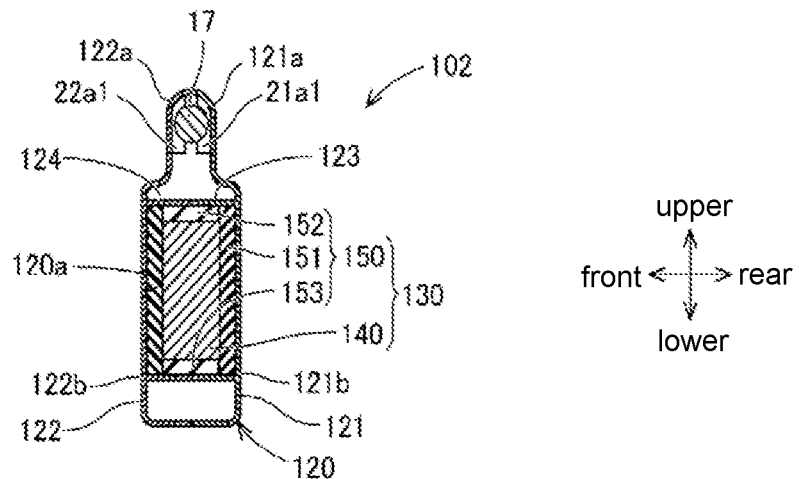
FIG. 9 is a cross-sectional view taken along V-V of FIG. 2, and includes a portion of the damper unit and the headrest stay of the second example.
Figure 10:
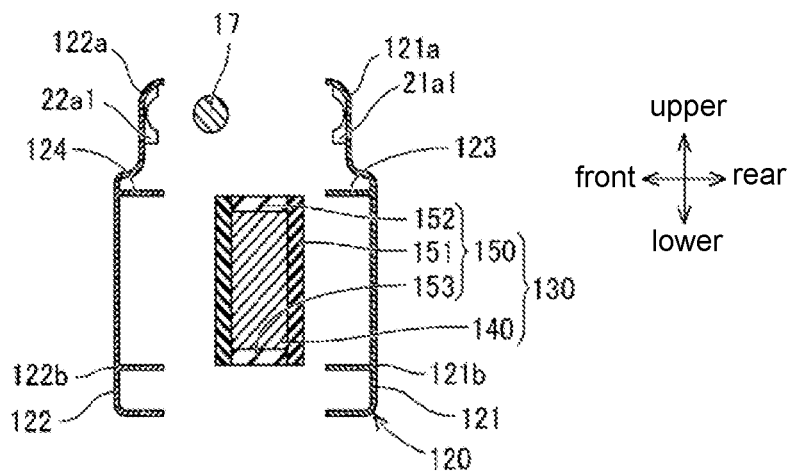
FIG. 10 is an exploded view of the components of FIG. 9.

The configuration of the head rest 13 is described with reference to FIG. 2. As shown in FIG. 2, the headrest 13 includes the headrest stay as the frame 13a, and the cushion 13b (indicated in a two-dot-chain line) having a cushioning property.

The headrest stay as the frame 13a is formed in a U shape. The two ends of the U shape is located on the lower side of the vehicle, and the connected portion of the U shape is located on the upper side of the vehicle. The headrest stay (13a) includes a pair of leg parts 16, 16, and a connection part 17 connecting the base ends of the pair of leg parts 16, 16. The pair of leg parts 16, 16 may be formed in a line shape, and may also be formed in a shape bent in the middle. The tips (two ends of the U shape) of the pair of leg parts 16, 16 are portions fitted into the seat back 12 (shown in FIG. 1). The connection part 17 (the connected portion of the U shape) in the headrest stay (13a) may be formed in a line shape as shown in FIG. 2, and may also be formed in a curved shape.

The cushion 13b includes a bag-like skin body and a foamed member arranged inside the skin body, and the skin body and the foamed member are integrated. The cushion 13b covers the connection part 17 and the base end side of the pair of leg parts 16, 16 of the headrest stay (13a), and exposes the tip ends of the pair of leg parts 16, 16 of the headrest stay (13a).

The shape of the cushion 13b may be any shape in accordance with the vehicle.

3. Example of Damper Unit 3-1. First Example

Regarding the damper unit 2 of the first example, descriptions are made with reference to FIGS. 2 to 6. As shown in FIG. 2, an example in which the damper unit 2 is attached to the headrest stay (13a) is described.

The damper unit 2 includes the case 20 attached to the frame 13a and the dynamic damper 30 accommodated in the case 20. The case 20 is fixed to a portion of the leg parts 16, 16 closer to the base end than the center in the axial direction and the connection part 17 in the frame 13a. However, the case 20 may also be fixed to any position of the frame 13a without being limited to the above.

As shown in FIGS. 3 to 6, the case 20 includes case bodies 21, 22 having outer wall surfaces, and partition walls 23, 24 erected on the inner wall surfaces of the case bodies 21, 22. The case 20 is formed by two members (21, 23 and 22, 24). Of course, the case 20 may also be formed by three or more members.

In the example, the case 20 includes a first case body 21 as the case body. The first case body 21 is formed in a container shape having an opening. The container shape includes a bottom surface and a peripheral wall surrounding the edge of the bottom surface. That is, the opening is provided, on the peripheral wall, on the side opposite to the bottom surface. In addition, in the example, the first case body 21 is described with an example having a bottom surface without a through hole. It is also noted that it is not necessary to have a clear boundary between the bottom surface and the peripheral wall.

The first case body 21 is arranged at the rear of the vehicle with respect to the headrest stay (13a). The first case body 21 includes an attachment part 21a and a damper holding part 21b. The attachment part 21a is formed in a shape in correspondence with an attachment portion to the headrest stay (13a). That is, the attachment part 21a is formed in a U shape corresponding to the vicinity of the base ends of the pair of leg parts 16 and the connection part 17.

In the example, the attachment part 21a is formed in a shape that faces the entire length of a surface (rear surface) of an attachment target portion of the headrest stay (13a) in the vehicle front-rear direction. However, any shape can be adopted, as long as the attachment part 21a is in a shape in partial connection with the attachment target portion of the headrest stay (13a). In addition, in the case where the damper unit 2 is attached to the seat body 11 or the seat back 12, the damper unit 2 is formed in a shape corresponding to the shapes of the frame 11a and 12a.

In addition, on the inner wall surface side of the attachment part 21a, multiple support members 21a1 for positioning the headrest stay (13a) are provided intermittently in the extending direction of the headrest stay (13a). The support member 21a1 has a concave portion corresponding to the axially right angle cross-sectional shape in the appearance of the headrest stay (13a). In the example, the support member 21a1 has an arc concave shaped portion. The support members 21a1, for example, are respectively provided at two places with respect to each leg part 16 and provided at two places with respect to the connection part 17. Of course, the number of the support members 21a1 may be determined arbitrarily.

In addition, while not shown in the drawings, the attachment part 21a has a portion for connection with a second case body 22 to be described in the following. The attachment part 21a includes, as a connection mechanism, a cylinder for inserting a fastening member such as a locking claw, a bolt, etc.

The damper holding part 21b forming the first case body 21 is continuously and integrally formed with the attachment part 21a, and, in the example, is provided on the central portion of the U-shaped attachment part 21a. The damper holding part 21b forms a portion of the bottom surface of the first case body 21, and is provided on the entirety of the central portion of the attachment part 21a. The inner wall surface of the damper holding part 21b is formed in a rectangular and planar shape. However, the damper holding part 21b may also adopt any external shape other than the rectangular shape, such as a circular shape, an elliptical shape, other polygonal shapes, etc., and may adopt any surface shape other than the planar shape, such as a curved surface shape, a convexo-concave surface shape, etc.

The case 20 includes the first partition wall 23 as the partition wall. The first partition wall 23 is provided on the inner wall surface of the first case body 21, and is erected on a surface having a normal component in the vehicle front-rear direction in the inner wall surface. The first partition wall 23 is provided on the inner wall surface of the damper holding part 21*b* in the first case body 21. Specifically, in the example, the first partition wall 23 is formed to extend in the vehicle front-rear direction.

In the example, the first partition wall 23 is formed in a continuous rectangular frame shape. That is, the first partition wall 23 has a pair of walls arranged to face each other in the vehicle left-right direction and a pair of walls arranged to face each other in the vehicle upper-lower direction. Accordingly, with the damper holding part 21*b* of the first case body 21 and the first partition wall 23, a rectangular container shape is formed.

The case 20 includes, in addition to the first case body 21, the second case body 22 as the case body. The second case body 22 blocks the opening of the first case body 21. In the example, the second case body 22 may be formed in a container shape having an opening, and may also be formed simply in a cover shape. In the example, the second case body 22 is formed in the same shape as the first case body 21. Accordingly, the second case body 22 is formed in a container shape having an opening.

The second case body 22 is arranged at the front of the vehicle with respect to the headrest stay (13*a*). The second case body 22 includes an attachment part 22*a* and a damper holding part 22*b*, like the first case body 21. Like the attachment part 21*a* of the first case body 21, the attachment part 22*a* includes multiple support members 22*a*1.

The case 20 includes, in addition to the first partition wall 23, the second partition wall 24 as the partition wall. The second partition wall 24 is provided on the inner wall surface of the second case body 22. The second partition wall 24 is formed in the same shape as the first partition wall 23. The second partition wall 24 has a pair of walls arranged to face each other in the vehicle left-right direction and a pair of walls arranged to face each other in the vehicle upper-lower direction. Accordingly, with the damper holding part 22*b* of the second case body 22 and the second partition wall 24, a rectangular container shape is formed.

In addition, with the rectangular container shape formed by the first case body 21 and the first partition wall 23 and the rectangular container shape formed by the second case body 22 and the second partition wall 24, an accommodation space 20*a* in a rectangular parallelepiped shape is formed. The accommodation space 20*a* is an enclosed space. That is, the damper holding part 21*b* of the first case body 21 and the damper holding part 22*b* of the second case body 22 are arranged to face each other in the vehicle front-rear direction, and form a pair of walls in the vehicle front-rear direction. The pair of walls of the first partition wall 23 in the vehicle left-right direction and the pair of walls of the second partition wall 24 in the vehicle left-right direction form a pair of walls in the vehicle left-right direction. The pair of walls of the first partition wall 23 in the vehicle upper-lower direction and the pair of walls of the second partition wall 24 in the vehicle upper-lower direction form a pair of walls in the vehicle upper-lower direction.

The dynamic damper 30 is arranged in the accommodation space 20*a* formed by the case 20. The dynamic damper 30 includes a mass 40 and an elastic body 50. The mass 40 is, for example, formed by metal. The mass 40 is formed in any shape. In the example, the mass 40 is formed in a cylindrical columnar shape. However, the mass 40 may also be formed in an elliptical columnar shape, a polygonal columnar shape, a spherical shape, etc. By making the shape of the mass 40 other than a spherical shape, the mass 40 exhibits an anisotropic property, thereby being able to exhibit a vibration-suppressing property that differs in accordance with direction.

The mass 40, for example, is arranged so that the columnar central shaft extends in the vehicle upper-lower direction. That is, the mass 40 is arranged so that the directions orthogonal to the columnar central shaft extend in the vehicle front-rear direction and the vehicle left-right direction. The posture of the mass 40 may vary in accordance with the vibration-suppressing property.

Here, in the mass 40, a peripheral surface connecting the vehicle front and rear surfaces of the mass 40 and the vehicle left and right surfaces of the mass 40 is defined as a first peripheral surface. In addition, in the mass 40, a peripheral surface connecting the vehicle front and rear surfaces of the mass 40 and the vehicle upper and lower surfaces of the mass 40 is defined as a second peripheral surface. In the mass 40, a peripheral surface connecting the vehicle left and right surfaces of the mass 40 and the vehicle upper and lower surfaces of the mass 40 is defined as a third peripheral surface. In the case where the mass 40 is formed in a cylindrical columnar shape and arranged in the posture, the first peripheral surface is a cylindrical surface, and the second and third peripheral surfaces serve as the surface connecting the two end surfaces of the cylindrical column and the cylindrical surface of the cylindrical column.

The gravity center of the mass 40, in the example, is located at the center of the mass 40. In addition, the first peripheral surface of the mass 40 includes the vehicle front and rear points and the vehicle left and right points with respect to the gravity center of the mass 40. In addition, the first peripheral surface of the mass 40 includes the vehicle front and rear points and the vehicle upper and lower points with respect to the gravity center of the mass 40. The third peripheral surface of the mass 40 includes the vehicle left and right points and the vehicle upper and lower points with respect to the gravity center of the mass 40. It is noted that the gravity center of the mass 40 may also be located at a location deviated from the center of the mass 40. In such case, the first peripheral surface, the second peripheral surface, and the third peripheral surface are arranged to include points corresponding to the gravity center.

The elastic body 50 holds the mass 40 and is accommodated in the case 20. A foamed resin material with an elastic property, an elastic material such as rubber or elastomer, etc., a composite material thereof can be used for the elastic body 50. Specifically, in the example, a foamed resin material is used for the elastic body 50.

In addition, the elastic body 50 is sandwiched between the mass 40 and the case 20. In the example, the elastic body 50 is in contact with the entire surface of the mass 40 and holds the posture of the mass 40. In addition, the elastic body 50 is arranged to contact the inner wall surface of the case 20. Specifically, in the accommodation space 20*a* of the case 20, the elastic body 50 is arranged in a compressed state in the vehicle front-rear direction, the vehicle left-right direction and the vehicle upper-lower direction.

In the example, the elastic body 50 at least includes an annular elastic body 51 as a member having a through hole. The annular elastic body 51 may be formed in an annular shape continuous throughout the entire periphery in the peripheral direction, and may also be formed in a C shape having a slit (notch) at a place. However, the annular elastic body 51 in such case is in a state of being formed in an annular shape when being assembled. Also, the annular shape is not limited to a circular annular shape, but may also refer to an elliptical annular shape, a polygonal annular shape, etc.

The mass 40 is fitted to the through hole of the annular elastic body 51 in a non-contact state, and the posture of the mass 40 is held in the through hole of the annular elastic body 51. The inner peripheral surface of the annular elastic body 51 is arranged to contact the whole peripheral surface of one of the first peripheral surface, the second peripheral surface, and the third peripheral surface of the mass 40. In the example, the annular elastic body 51 includes a through hole penetrating in the vehicle front-rear direction. The annular elastic body 51 is arranged to contact the entire periphery of the third peripheral surface (the vehicle left and right surfaces and the vehicle upper and lower surfaces) of the mass 40. In addition, the annular elastic body 51 is formed in a rectangular frame shape. That is, the inner peripheral surface and the outer peripheral surface of the annular elastic body 51 are formed in a rectangular shape. The inner peripheral surface of the annular elastic body 51 is formed in a rectangular shape in which the vehicle upper-lower direction serves as the longitudinal direction.

The annular elastic body 51 is formed in a flat shape, that is, a shape in which the thickness in the penetration direction is smaller than the outer shape in a direction orthogonal to the penetration direction. The thickness of the annular elastic body 51 is smaller than the maximum thickness of the mass 40 in the vehicle front-rear direction. That is, in the state of being fitted to the through hole of the annular elastic body 51, the mass 40 protrudes from a first opening of the annular elastic body 51 and protrudes from a second opening (an opening on the opposite side of the first opening) of the annular elastic body 51.

In addition, a separation distance on the inner peripheral surface of the annular elastic body 51 in the vehicle left-right direction is slightly smaller than the maximum thickness of the mass 40 in the vehicle left-right direction. Accordingly, in the state in which of being fitted to the through hole of the annular elastic body 51, the mass 40 is compressed in the vehicle left-right direction by the annular elastic body 51. In addition, a separation distance on the inner peripheral surface of the annular elastic body 51 in the vehicle upper-lower direction is slightly smaller than the maximum length of the mass 40 in the vehicle upper-lower direction. Accordingly, in the state of being fitted to the through hole of the annular elastic body 51, the mass 40 is compressed in the vehicle upper-lower direction by the annular elastic body 51.

Also, in addition to the annular elastic body 51, the elastic body 50 includes a first elastic body sheet 52. The first elastic body sheet 52 is formed in a flat shape, such as having the same outer peripheral shape as the outer peripheral shape of the annular elastic body 51. In the example, the first elastic body sheet 52 is formed in the same rectangular shape as the outer shape of the annular elastic body 51. The first elastic body sheet 52 is arranged to be overlapped with the end surface of the annular elastic body 51 on the first opening side in the penetration direction. That is, the first elastic body sheet 52 blocks the first opening (the opening on the rear of the vehicle) of the through hole of the annular elastic body 51.

The first elastic body sheet 52 may be arranged to be bonded to at least a portion of the annular elastic body 51 while not being bonded to the remaining portion, and may also be arranged to be not bonded with respect to the entire surface of the annular elastic body 51. In the case of being bonded, the relative positioning accuracy between the first elastic body sheet 52 and the annular elastic body 51 can be maintained to be high. Meanwhile, in the case of not being bonded, the manufacturing man-hours can be reduced.

The surface of the first elastic body sheet 52 in contact with the annular elastic body 51 is formed to be planar. In addition, the first elastic body sheet 52 contacts, in a compressed state, the surface of the mass 40 protruding from the first opening to the rear of the vehicle.

Like the annular elastic body 51, the first annular elastic body sheet 52 is formed by a foamed resin material, rubber, elastomer, etc. However, the first elastic body sheet 52 may be molded by a material different from that of the annular elastic body 51, and may also be molded by the same material as that of the annular elastic body 51. By molding the first elastic body sheet 52 and the annular elastic body by using different materials, vibration-suppressing properties can be different in accordance with direction.

In addition, in addition to the annular elastic body 51 and the first elastic body sheet 52, the elastic body 50 includes a second elastic body sheet 53. The second elastic body sheet 53, like the first elastic body sheet 52, is formed in a flat shape, such as having the same outer peripheral shape as the outer peripheral shape of the annular elastic body 51. In the example, the second elastic body sheet 53 is formed in the same rectangular shape as the outer shape of the annular elastic body 51. The second elastic body sheet 53 is formed in the same shape as the first elastic body sheet 52. The second elastic body sheet 53 is arranged to be overlapped with the end surface of the annular elastic body 51 on the second opening side in the penetration direction. That is, the second elastic body sheet 53 blocks the second opening (the opening on the front of the vehicle) of the through hole of the annular elastic body 51.

The second elastic body sheet 53 may be bonded to at least a portion of the annular elastic body 51, and may also be arranged to be not bonded with respect to the entire surface of the annular elastic body 51. In the case of being bonded, the relative positioning accuracy between the first elastic body sheet 52 and the annular elastic body 51 can be maintained to be high. Meanwhile, in the case of not being bonded, the manufacturing man-hours can be reduced.

The surface of the second elastic body sheet 53 in contact with the annular elastic body 51 is formed to be planar. In addition, the second elastic body sheet 53 contacts, in a compressed state, the surface of the mass 40 protruding from the second opening to the front of the vehicle. That is, the first elastic body sheet 52 and the second elastic body sheet 53 sandwich the mass 40 in the vehicle front-rear direction.

Like the annular elastic body 51, the second annular elastic body sheet 53 is formed by a foamed resin material, rubber, elastomer, etc. However, the second elastic body sheet 53 may be molded by a material different from that of the annular elastic body, and may also be molded by the same material as that of the annular elastic body 51. By molding the first elastic body sheet 52 and the annular elastic body by using different materials, vibration-suppressing properties can be different in accordance with direction. However, the second elastic body sheet 53 may be molded by using the same material as the material of the first elastic body sheet 52.

As described above, the mass 40 is fitted into a space surrounded by the inner peripheral surface of the annular elastic body 51, a side surface of the first elastic body sheet 52 in the thickness direction, and a side surface of the second elastic body sheet 53 in the thickness direction. It is not necessary that the mass 40 is in contact with the entire surface, and a gap may be interposed at a portion. However, the mass 40 is held so that the posture can be maintained in all the directions in the vehicle front-rear direction, the vehicle left-right direction, and the vehicle upper-lower direction.

The dynamic damper 30 formed by the mass 40 and the elastic body 50 is arranged in the accommodation space 20$a$ of the case 20. In the example, the outer shape of the elastic body 50 is formed in a rectangular parallelepiped shape corresponding to the accommodation space 20$a$. Specifically, the outer shape of the elastic body 50 is formed in a rectangular parallelepiped shape slightly larger than the accommodation space 20$a$.

A pair of surfaces of the outer peripheral surface of the annular elastic body 51 in the vehicle left-right direction are arranged in contact with a pair of walls of the first partition wall 23 and the second partition wall 24 in the vehicle left-right direction. That is, the facing portions of the annular elastic body 51 in the vehicle left-right direction are compressed in the vehicle left-right direction by the mass 40 and the partition walls 23 and 24.

A pair of surfaces of the outer peripheral surface of the annular elastic body 51 in the vehicle upper-lower direction are arranged in contact with a pair of walls of the first partition wall 23 and the second partition wall 24 in the vehicle upper-lower direction. That is, the facing portions of the annular elastic body 51 in the vehicle upper-lower direction are compressed in the vehicle upper-lower direction by the mass 40 and the partition walls 23 and 24.

The first elastic body sheet 52 is arranged on the side of the first case body 21 in the accommodation space 20$a$. The other side surface (the side surface on the rear of the vehicle) of the first elastic body sheet 52 in the thickness direction is arranged to contact the entire surface of the damper holding part 21$b$ of the first case body 21. That is, the central portion of the first elastic body sheet 52 is compressed in the vehicle front-rear direction by the mass 40 and the inner wall surface of the damper holding part 21$b$ of the first case body 21.

In addition, the outer peripheral surface of the first elastic body sheet 52 in the flat shape, like the annular elastic body 51, is arranged in contact with the first partition wall 23 and the second partition wall 24. That is, the first elastic body sheet 52 is compressed in the vehicle left-right direction and the vehicle upper-lower direction by the first partition wall 23 and the second partition wall 24.

The second elastic body sheet 53 is arranged on the side of the second case body 22 in the accommodation space 20$a$. The other side surface (the side surface on the front of the vehicle) of the second elastic body sheet 53 in the thickness direction is arranged to contact the entire surface of the damper holding part 22$b$ of the second case body 22. That is, the central portion of the second elastic body sheet 53 is compressed in the vehicle front-rear direction by the mass 40 and the inner wall surface of the damper holding part 22$b$ of the second case body 22.

In addition, the outer peripheral surface of the second elastic body sheet 53 in the flat shape, like the annular elastic body 51, is arranged in contact with the first partition wall 23 and the second partition wall 24. That is, the second elastic body sheet 53 is compressed in the vehicle left-right direction and the vehicle upper-lower direction by the first partition wall 23 and the second partition wall 24.

In addition, the annular elastic body 51, the outer peripheral portion of the first elastic body sheet 52, and the outer peripheral portion of the second elastic body sheet 53 are compressed in the vehicle front-rear direction by the inner wall surface of the damper holding part 21$b$ of the first case body 21 and the inner wall surface of the damper holding part 22$b$ of the second case body 22.

As described above, the mass 40 is fitted to the through hole of the annular elastic body 51. Accordingly, the mass 40 is held at a stable posture in the annular elastic body 51. As a result, the dynamic damper 30 can easily exhibit the desired properties. In addition, the annular elastic body 51 is formed in a shape having a through hole. Therefore, compared with an elastic body in a shape of a bottomed container, the annular elastic body 51 having a through hole is capable of suppressing different properties depending on parts in the penetration direction. From this as well, the dynamic damper 30 can easily exhibit the desired properties.

In addition, the elastic body 50 has a three-layered structure formed by the annular elastic body 51, the first elastic body sheet 52, and the second elastic body sheet 53. Accordingly, by adding the two sheets 52 and 53 on the basis of the annular elastic body 51, the elastic body 50 can possess a posture holding force which stabilizes the mass 40, and can exhibit the desired vibration-suppressing properties in the respective directions. The dynamic damper 30, for example, can exhibit the desired properties in the respective directions of the vehicle front-rear direction, the vehicle left-right direction, and the vehicle upper-lower direction.

Specifically, with the three-layered structure of the elastic body 50, the material of the annular elastic body 51 and the material of the first elastic body sheet 52 and the second elastic body sheet 53 can be different easily. As a result, vibration-suppressing properties can be easily set in accordance with direction for the dynamic damper 30, while the dynamic damper 30 possesses a posture holding force which stabilizes the mass 40. However, even in the case where the material of the annular elastic body 51 and the material of the first elastic body sheet 52 and the second elastic body sheet 53 are the same, by making the thicknesses different in accordance with direction, the vibration-suppressing properties can also be set in accordance with direction.

3-2. Second Example

Regarding a damper unit 102 of the second example, descriptions are made with reference to FIGS. 7 to 10. Regarding the damper unit 102 of the second example, the following mainly describes the portion different from the damper unit 2 of the first example. Also, those same as the first example are labeled with the same reference symbols.

The damper unit 102 includes a case 120 and a dynamic damper 130. The case 120 includes a first case body 121, a second case body 122, a first partition wall 123, and a second partition wall 124.

The first case body 121 has an attachment part 121$a$ same as the attachment part 21$a$ of the first example. The first case body 121 further includes a damper holding part 121$b$. The damper holding part 121$b$ has a different shape from that of the damper holding part 21$b$ of the first example, but has the same function. The damper holding part 121$b$ is formed in a curved shape similar to a substantially semi-cylindrical shape. The outer wall surface of the damper holding part 121$b$ is formed in a curved convex shape, and the inner wall surface is formed in a curved concave shape. In addition, the damper holding part 121$b$ has a half (semi-circular shape) of two end surfaces of a substantially cylindrical shape. The damper holding part 121$b$ is not limited to a semi-cylindrical shape, but may also be in a semi-elliptical cylindrical shape.

The second case body 122 is formed in the same shape as the first case body 121. The second case body 122 has an attachment part 122a same as the attachment part 22a of the first example. The second case body 122 further includes a damper holding part 122b in the same shape as the damper holding part 121b of the first case body 121.

The first partition wall 123 is provided on the inner wall surface of the first case body 121, and forms a peripheral wall provided on the outer side of the damper holding part 121b. The second partition wall 124 is provided on the inner wall surface of the second case body 122, and forms a peripheral wall provided on the outer side of the damper holding part 122b. The first partition wall 123 and the second partition wall 124 are formed in an elongated frame shape. Specifically, the first partition wall 123 and the second partition wall 124 are formed in an elongated frame shape in which the vehicle upper-lower direction is set as the longitudinal direction.

Accordingly, with the damper holding part 121b of the first case body 121 and the first partition wall 123, a rectangular container shape having a curved bottom surface is formed. In addition, with the damper holding part 122b of the second case body 122 and the second partition wall 124, a rectangular container shape having a curved bottom surface is formed. In addition, with the rectangular container shape formed by the first case body 121 and the first partition wall 123 and the rectangular container shape formed by the second case body 122 and the second partition wall 124, an accommodation space 120a is formed. The accommodation space 120a is a space in a shape similar to a cylindrical columnar shape.

The dynamic damper 130 is arranged in the accommodation space 120a formed by the case 120, and includes a mass 140 and an elastic body 150. In the example, the mass 140 is formed in a cylindrical columnar shape. However, the mass 140 may also be formed in a regular polygonal columnar shape.

The elastic body 150 includes at least an annular elastic body 151 as a member having a through hole. The annular elastic body 151 is formed in a cylindrical shape. The annular elastic body 151 has the same thickness in the radial direction. That is, the annular elastic body 151 has a cylindrical inner peripheral surface and a cylindrical outer peripheral surface. However, the annular elastic body 151 may also have a cylindrical inner peripheral surface and an elliptical cylindrical outer peripheral surface. In such case, the thickness of the annular elastic body 151 in the radial direction differs in accordance with the location in the peripheral direction.

The inner diameter of the inner peripheral surface of the annular elastic body 151 is slightly smaller than the outer diameter of the outer peripheral surface of the mass 140. In addition, the mass 140 is fitted to the through hole of the annular elastic body 151 in a non-contact state, and the posture of the mass 140 is held in the through hole of the annular elastic body 151. That is, the inner peripheral surface of the annular elastic body 151 in a tubular shape is in contact with the entire periphery of the outer peripheral surface of the mass 150 in a columnar shape.

Here, the inner peripheral surface of the annular elastic body 151 is arranged to contact the whole peripheral surface of one of the first peripheral surface, the second peripheral surface, and the third peripheral surface of the mass 140. In the example, the annular elastic body 151 includes a through hole penetrating in the vehicle upper-lower direction. The annular elastic body 151 is arranged to contact the entire periphery of the first peripheral surface (the vehicle front and rear surfaces and the vehicle left and right surfaces) of the mass 140.

The elastic body 150 further includes a first elastic body sheet 152 and a second elastic body sheet 153. The first elastic body sheet 152 and the second elastic body sheet 153 are formed in a disc shape. The first elastic body sheet 152 is fitted into the first opening side in the through hole of the annular elastic body 151, and in contact with the surface of the mass 140 on the first opening side. The second elastic body sheet 153 is fitted into the second opening side in the through hole of the annular elastic body 151, and in contact with the surface of the mass 140 on the second opening side.

The dynamic damper 130 formed by the mass 140 and the elastic body 150 is arranged in the accommodation space 120a of the case 120. In the example, the outer shape of the elastic body 150 is a substantially cylindrical columnar shape, and has a shape corresponding to the accommodation space 120 in a shape similar to the cylindrical columnar shape.

The portion of the outer peripheral surface of the annular elastic body 151 in the vehicle front-rear direction is compressed in the vehicle front-rear direction by the inner wall surface of the damper holding part 121b of the first case body 121 and the inner wall surface of the damper holding part 122b of the second case body 122. In addition, the portion of the outer peripheral surface of the annular elastic body 151 in the vehicle left-right direction is compressed in the vehicle left-right direction by the first partition wall 123 and the second partition wall 124.

In addition, the annular elastic body 151 is compressed in the vehicle upper-lower direction by the first partition wall 123 and the second partition wall 124. In addition, the first elastic body sheet 152 is compressed in the vehicle upper-lower direction by the first partition wall 123 and the second partition wall 124 as well as the end surface of the mass 140 in the axial direction. The second elastic body sheet 153 is compressed in the vehicle upper-lower direction by the first partition wall 123 and the second partition wall 124 as well as the end surface of the mass 140 in the axial direction.

As described above, the mass 140 is fitted to the through hole of the annular elastic body 151. Accordingly, the mass 140 is held at a stable posture in the annular elastic body 151. As a result, the dynamic damper 130 can easily exhibit the desired properties.

3-3. Third Example

Figure 11:
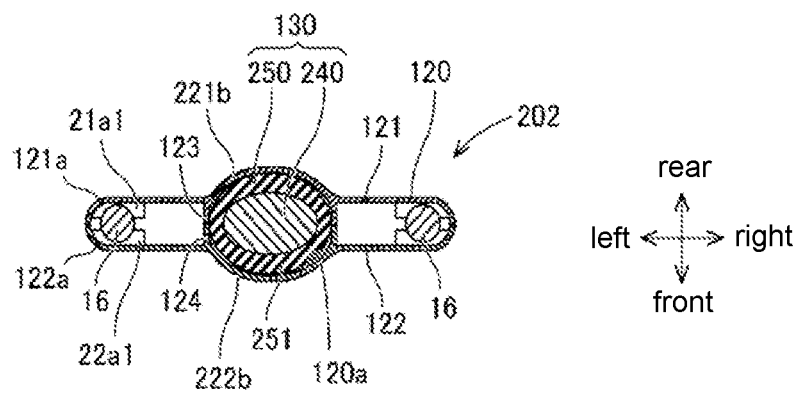
FIG. 11 is a cross-sectional view taken along III-III of FIG. 2, and includes a portion of a damper unit and a headrest stay of a third example.

Regarding a damper unit 202 of the third example, descriptions are made with reference to FIG. 11. Regarding the damper unit 202 of the third example, the following mainly describes the portion different from the damper unit 102 of the second example. Also, those same as the second example are labeled with the same reference symbols.

Compared with the damper unit 102 of the second example, the damper unit 202 of the third example differs only in the shapes of damper holding parts 221b, 222b, a mass 240, and an annular elastic body 251 in an elastic body 250. The damper holding parts 221b, 222b are formed in a curved shape similar to a substantially semi-elliptical cylindrical shape. The mass 240 is formed in an elliptical cylindrical columnar shape, and the annular elastic body 251 is formed in an elliptical cylindrical shape.

The mass 240 and the annular elastic body 251 are accommodated in the case 120 so that the elliptical long axes of the mass 240 and the annular elastic body 251 are consistent in the vehicle left-right direction, and the elliptical short axes of the mass 240 and the annular elastic body 251 are consistent in the vehicle front-rear direction. Accordingly, the areas which the mass 240 faces are respectively different in the vehicle front-rear direction and the vehicle left-right direction. As a result, the vibration-suppressing properties in the vehicle front-rear direction and the vehicle left-right direction can be different.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A vehicle seat, comprising:
a frame;
a case, attached to the frame; and
a dynamic damper, accommodated in the case and comprising a mass and an elastic body,
wherein:
the elastic body at least comprises an annular elastic body as a member having a through hole,
the mass is fitted to the through hole of the annular elastic body, and an outer peripheral surface of the annular elastic body is arranged to contact an inner wall surface of the case,
wherein the elastic body further comprises:
a first elastic body sheet, arranged to be overlapped with an end surface of the annular elastic body on a side of a first opening in a penetration direction, and contacting a surface of the mass on the side of the first opening,
a second elastic body sheet, arranged to be overlapped with an end surface of the annular elastic body on a side of a second opening, which is a side opposite to the first opening, in the penetration direction, and contacting a surface of the mass on the side of the second opening,
wherein the elastic body covers an entire surface of the mass such that no surface of the mass is exposed.

2. The vehicle seat as claimed in claim 1, wherein a peripheral surface connecting vehicle front and rear surfaces of the mass and vehicle left and right surfaces of the mass is set as a first peripheral surface,
a peripheral surface connecting the vehicle front and rear surfaces of the mass and vehicle upper and lower surfaces of the mass is set as a second peripheral surface,
a peripheral surface connecting the vehicle left and right surfaces of the mass and the vehicle upper and lower surfaces of the mass is set as a third peripheral surface,
an inner peripheral surface of the annular elastic body is arranged to contact an entire periphery of one of the first peripheral surface, the second peripheral surface, and the third peripheral surface of the mass.

3. The vehicle seat as claimed in claim 2, wherein the first peripheral surface comprises vehicle front and rear points and vehicle left and right points with respect to a gravity center of the mass,
the second peripheral surface comprises the vehicle front and rear points and vehicle upper and lower points with respect to the gravity center of the mass, and
the third peripheral surface comprises the vehicle left and right points and the vehicle upper and lower points with respect to the gravity center of the mass.

4. The vehicle seat as claimed in claim 1, wherein the mass protrudes from the first opening of the annular elastic body, and protrudes from the second opening of the annular elastic body.

5. The vehicle seat as claimed in claim 1, wherein the annular elastic body is formed in a flat shape in which a thickness in the penetration direction is smaller than an outer shape in a direction orthogonal to the penetration direction.

6. The vehicle seat as claimed in claim 1, wherein the annular elastic body and the first elastic body sheet are molded by using different materials, and
annular elastic body and the second elastic body sheet are molded by using different materials.

7. The vehicle seat as claimed in claim 1, wherein the annular elastic body, the first elastic body sheet, and the second elastic body sheet are molded by using a same material.

8. The vehicle seat as claimed in claim 1, wherein the first elastic body sheet and the second elastic body sheet are bonded to at least a portion of the annular elastic body.

9. The vehicle seat as claimed in claim 1, wherein the first elastic body sheet and the second elastic body sheet are arranged to be not bonded to the annular elastic body.

10. The vehicle seat as claimed in claim 1, wherein the annular elastic body is formed in a rectangular frame shape, and
the first elastic body sheet and the second elastic body sheet are foiiiied in a same rectangular shape as an outer shape of the annular elastic body.

11. A vehicle seat, comprising:
a frame;
a case, attached to the frame; and
a dynamic damper, accommodated in the case and comprising a mass and an elastic body,
wherein:
the elastic body at least comprises an annular elastic body as a member having a through hole,
the mass is fitted to the through hole of the annular elastic body, and an outer peripheral surface of the annular elastic body is arranged to contact an inner wall surface of the case,
wherein the mass is formed in a cylindrical columnar shape or an elliptical cylindrical columnar shape,
the annular elastic body is formed in a cylindrical shape or an elliptical cylindrical, and
an inner peripheral surface of the annular elastic body in a tubular shape is in contact with an outer peripheral surface of the mass in a columnar shape,
wherein the elastic body further comprises:
a first elastic body sheet, fitted to the through hole of the annular elastic body on a side of a first opening and contacting a surface of the mass on the side of the first opening; and
a second elastic body sheet, fitted to the through hole of the annular elastic body on a side of a second opening, which is opposite to the first opening, and contacting a surface of the mass on the side of the second openin$_g$.,
wherein the elastic body covers an entire surface of the mass such that no surface of the mass is exposed.

12. The vehicle seat as claimed in claim 1, wherein the case comprises:
a case body having an outer wall surface; and
a pair of partition walls, erected on a surface having a normal component in a vehicle front-rear direction in an inner wall surface of the case body and arranged to face each other in a vehicle left-right direction,
wherein:
the dynamic damper is arranged in an accommodation space formed by the inner wall surface of the case body and the pair of partition walls.

13. The vehicle seat as claimed in claim 12, wherein the elastic body is arranged to be compressed in the vehicle left-right direction by the pair of partition walls.

14. The vehicle seat as claimed in claim 12, wherein the case body comprises:
- a first case body, arranged at a side in the vehicle front-rear direction and formed in a container shape having an opening; and
- a second case body, arranged at another side in the vehicle front-rear direction, blocking the opening of the first case body, and formed in a container shape or a cover shape having an opening wherein:
- the elastic body is arranged to be compressed in the vehicle front-rear direction by an inner wall surface of the first case body and an inner wall surface of the second case body.

15. The vehicle seat as claimed in claim 1, wherein the frame is a headrest stay, and
the case is attached to the headrest stay.

\* \* \* \* \*